United States Patent Office 2,744,072
Patented May 1, 1956

2,744,072

PHOSPHOR COATING COMPOSITION

George Meister, Newark, N. J., assignor to Westinghouse Electric Corporation, East Pittsburgh, Pa., a corporation of Pennsylvania No Drawing. Application June 24, 1953, Serial No. 363,935

6 Claims. (Cl. 252—301.3)

The present invention relates to compositions for coating vitreous surfaces with luminescent materials and, more particularly, to compositions for coating a luminescent material on the inside surface of vitreous tubes which are to be used as fluorescent lamp envelopes.

In order to use the ultraviolet radiation of a low pressure positive column mercury discharge, the inside surface of fluorescent lamp envelopes are generally provided with a coating of luminescent material which is applied by suspending the material in a liquid vehicle and coating the inside surface of the envelope with the suspension. This final suspension which is used as the coating material is known in the industry as a "paint." Since most solvents which are components of the paint which will not harm the luminescent materials and which may be removed from the final coating have too low a viscosity to produce a smooth even coating when the suspension consists solely of a luminescent material suspended in the solvent, a viscosity imparting and controlling agent is generally a component of the paint. The present practice of the industry is to use a solution of nitrocellulose in butyl or amyl acetate as the viscosity imparting and controlling agent and suspending medium for the luminescent material. The nitrocellulose imparts the desired viscosity to the solution so that it is possible to obtain a smooth, even coating of a luminescent material on the vitreous inner surface of the lamp envelope, which nitrocellulose viscosity controlling agent and suspending medium may be burned or baked out after the coating has been applied, and the butyl or amyl acetate has been volatilized from the coating.

While the present use of a solution of nitrocellulose in butyl or amyl acetate has proved satisfactory, as far as the quality of coating is concerned, the cost of butyl or amyl acetate is comparatively high, which is extremely important in a highly competitive field such as the lamp industry. Any substance which can improve the finish coating of luminescent materials and still meet the other requirements of low cost, facility of removal of the suspending medium from the coating and freedom from any residue of foreign matter which will affect the luminescent characteristics of the fluorescent material, is indeed a step forward in the art.

There is disclosed in co-pending application of Robert W. Repsher, Ser. No. 307,390, filed Aug. 30, 1952, entitled "Luminescent Coating Composition & Method of Applying" and assigned to the present assignee, the use of a liquid vehicle consisting of a water soluble cellulose binder to control the viscosity of the paint and thus make possible a smooth, even, low cost coating. I have found that the quality of coating obtained by the coating composition disclosed by Repsher in the heretofore noted co-pending application can be readily improved upon at no added cost by the addition of an alkalizing agent which simultaneously acts as a dispersing agent.

Therefore the principal object of my invention is to provide an inexpensive paint for applying luminescent material to a vitreous surface, which paint includes as one component thereof an alkalizing and dispersing agent.

Another object of my invention is to provide an inexpensive water base paint for applying luminescent materials to vitreous surfaces, which paint consists of a luminescent material suspended in a liquid vehicle, which vehicle has as a component thereof an alkalizing and dispersing agent.

A further object of my invention is to provide an inexpensive paint for applying luminescent materials to vitreous surfaces, a component of which paint is a dispersing and alkalizing medium that is readily removable from the coating without leaving a residue which will affect the luminescent qualities of the luminescent materials.

Yet another object of my invention is to provide a smooth flowing paint consisting of a luminescent material suspended in a liquid vehicle, which vehicle consists of a solution of a water soluble organic binder and a water base solvent mixture, a component of which water base solvent mixture is ammonium hydroxide or an amine.

A further object of my invention is to provide optimum and allowable ranges for the components which comprise my paint.

The aforesaid objects of the invention, and other objects which will become apparent as the description proceeds, are achieved by providing a smooth flowing coating composition or paint consisting of a luminescent material suspended in a liquid vehicle, which liquid vehicle consists of a solution of methyl cellulose and a water base solvent mixture. The water base solvent mixture is basically comprised of water and an alkalizing medium consisting of ammonium hydroxide or an amine. A flow agent is also a component of the water base solvent mixture and, if desired, a plasticizer may also be added to increase the quality of coating.

Thus basically, my coating composition or paint consists of a luminescent material suspended in a liquid vehicle. The liquid vehicle consists of a solution of a water soluble organic binder and a water base solvent mixture. The water base solvent mixture consists of water, an alkalizer, a flow agent and, if desired, a plasticizer.

As disclosed in the heretofore-noted co-pending Repsher application, methyl cellulose is especially suitable as a binder for use with an aqueous solution of luminescent materials. The aqueous solution of methyl cellulose cannot be used alone as a liquid vehicle, however, because the flow and dispersing characteristics of such a solution are unsatisfactory. In order to increase the flow and dispersing characteristics of my paint, I have found a flow agent may be added to the methyl cellulose and water. In addition, and as heretofore noted, I have found that the resulting coating of luminescent materials is much improved and the luminescent material is much better dispersed throughout the paint if an alkalizing-dispersing agent is added as a component of the paint.

The dispersing or alkalizing agent may be ammonium hydroxide or any amine whose boiling point (at 760 mm.) is below 100° C. Amines may be broadly defined as organic compounds whose aqueous solutions are alkaline, and a specific example of an amine which may be used in my coating composition is butylamine.

As a flow agent which, as heretofore noted, is also a necessary component of the water base solvent mixture, I may use methyl alcohol or a mono-hydroxy alcohol which is higher in the alcohol series than methyl alcohol, such as ethyl and the propyl alcohols, which have a boiling point below 100° C. (at 760 mm.) and which are completely water soluble. In the heretofore-noted co-pending Repsher application it was noted that methyl alcohol was unsatisfactory as a flow agent. I attribute this unsatisfactory performance to the free acids normally present in commercially available methyl alcohol. The addition of the alkalizing and dispersing agent, of course, neutralizes the free acids present, thus permitting the use of methyl alcohol as a flow agent, while simultaneously better dispersing the luminescent material throughout the suspension. In support of this theory, I have found that where ultra pure methyl alcohol is available, it may be used as a flow agent without the addition of the alkalizing or dispersing agent, although it is not commercially practical to use such ultra pure methyl alcohol.

As heretofore noted, the quality of the coating is still further improved by the addition of a plasticizer to the water base solvent mixture. The function of this plasticizer is to "flow-out" or level the film of coating composition, and to increase the yield point of the film, thus decreasing the tendency of the film to crack during the drying or baking treatments, as hereinafter explained.

As a plasticizer I may use glycerine, triethylene glycol, tetraethylene glycol, triethylene phosphate, or triethanolamine.

A typical phosphor which may be used in my paint is a 3500° K. halophosphate. By explanation of this term, halophosphates are compounds more or less analogous to the natural mineral apatite, and are supposed to be represented by a formula such as $3M_3(PO_4)_2 \cdot 1M'L_2$, where L represents a halogen or a mixture of halogens and M and M' represent either different or identical bivalent metals or mixtures of such metals. A 3500° K. halophosphate is a term well-known in the art and represents a halophosphate having the same chromaticity as a black body at the designated temperature.

In preparing my coating composition, I am governed by various limitations. While the ratio of phosphor to binder is in no way critical, the binder should constitute not less than 1% by weight and no more than 3% by weight of the luminescent material, if a good luminescent coating is to be obtained. If the percent by weight of methyl cellulose binder to phosphor is less than 1%, the suspension of luminescent material in the liquid vehicle will be comparatively poor. If the percent by weight of methyl cellulose to phosphor is more than 3%, the methyl cellulose binder will be difficult to bake out after it is coated. The baking out step in the application of the luminescent coating to the vitreous surface is hereinafter explained.

The ratio of weight of phosphor to volume of vehicle should be no less than 0.25 gram per cubic centimeter, nor greater than 0.5 gram per cubic centimeter of vehicle. If the ratio is less than 0.25 gram per cubic centimeter, the phosphor material will be too thinly dispersed, and if the ratio is greater than 0.5 gram per cubic centimeter, the phosphor material will not be sufficiently dispersed to give a good coating.

I have found that the viscosity of my paint should fall within the range of 100 to 200 cps. If the paint viscosity is greater than 200 cps., the resulting luminescent coating will be too thick, and if the paint viscosity is below 100 cps., the resulting luminescent coating will be too thin.

The viscosity of methyl cellulose which is commercially available varies from 4000 to 10 cps. I have found that 4000, 1500 and 400 cps. methyl cellulose is suitable for use as a binder in my coating composition. If a commercially available methyl cellulose having a viscosity below 400 cps. is used, the resulting percentage by weight of methyl cellulose to phosphor will exceed the 3% limitation if a paint viscosity of 100 cps. is to be obtained, and the ratio of weight of phosphor to volume of luminescent material is not to exceed 0.5 gram per cc. vehicle.

A sufficient amount of flow agent and water is included in the final paint to give it a viscosity which falls within the heretofore recited limitations. There is no sure way of predicting in advance just how much flow agent and water will be required for each paint formulation, but if the foregoing limitations of percent by weight of binder to phosphor, phosphor to vehicle and paint viscosities are used as a guide, the amount of flow agent and water in each paint formulation may easily be emperically determined by any man skilled in the art. The percentage by volume of flow agent to volume of liquid vehicle should be at least 30 in order that the proper flow characteristics be maintained. The upper limit of percentage by volume of flow agent to volume of paint will vary greatly, depending upon the concentration of methyl cellulose used and the final paint viscosity which is to be obtained. It is obvious that the less flow agent I use, the more water I can use to reach the desired final paint viscosity. By using a greater percentage of water, my paint becomes cheaper which, as heretofore pointed out, is a most important consideration.

The percentage of the ammonium hydroxide or amine alkalizing-dispersing agent should be at least 3% by volume of the total liquid vehicle, in order to insure an alkaline solution and to insure proper dispersing of the phosphor throughout the paint. The percentage by volume of the liquid vehicle of alkalizing-dispersing agent should not exceed 10% in order to maintain flow characteristics, and in no case should the pH of my final paint exceed 12, in order to maintain the solution.

Where I have designated ammonium hydroxide, I refer to a 28% solution. This concentration may be varied, if desired.

Regarding the amounts of the heretofore-noted plasticizers which I may use, if desired, I am governed by the dictates of cost vs. improvement in coating composition. Based on these considerations I have found it economically impractical to use plasticizers in amounts which exceed 25% by volume of the liquid vehicle. In addition, if the ratio by volume of plasticizer to liquid vehicle is greater than 1 to 4, the paint will dry very slowly and the manufacturing difficulties in appying the luminescent coating on the vitreous surface will be greatly increased.

Thus the foregoing limitations which control the amounts of the individual components in my final paint may be briefly summarized as follows:

| | |
|---|---|
| Percent by weight of methyl cellulose to phosphor | 1–3. |
| Ratio by weight of phosphor to volume of vehicle | 0.25–0.5 gr./cc. |
| Percent by volume of alkalizing-dispersing agent to total vehicle | 3–10 |
| Flow agent and water in amounts sufficient to limit final paint viscosities at 20° C. between | 100–200 cps. |
| Percent by volume of flow agent to volume of liquid vehicle | No less than 30. |
| Percent by volume of plasticizer to liquid vehicle | 0–25. |

The following specific examples of coating compositions are additional illustrations of the present invention and are not to be considered as limiting the scope thereof:

EXAMPLE I

| | Amounts | Percent Relationships |
|---|---|---|
| Phosphor | 3 grams | 0.29 g./cc. vehicle. |
| Methyl cellulose (4,000 cps.) | 3 cc.—2% solution. | 2% of phosphor. |
| Ammonium hydroxide (28% solution). | .5 cc | 4.8% of vehicle. |
| Isopropyl alcohol | 7 cc | 67% of vehicle. |

EXAMPLE II

| | Amounts | Percent Relationships |
|---|---|---|
| Phosphor | 3 grams | 0.27 g./cc. vehicle. |
| Methyl cellulose (4,000 cps.) | 3 cc.—2% solution. | 2% of phosphor. |
| Ammonium hydroxide (28% solution). | 1 cc | 9% of vehicle. |
| Isopropyl alcohol | 7 cc | 64% of vehicle. |

EXAMPLE III

| | Amounts | Percent Relationships |
|---|---|---|
| Phosphor | 4.6 grams | 0.42 g./cc. vehicle. |
| Methyl cellulose (4,000 cps.) | 3 cc.—2% solution. | 1.3% of phosphor. |
| Ammonium hydroxide (28% solution). | 1 cc | 9% of vehicle. |
| Methyl alcohol | 7 cc | 64% of vehicle. |

EXAMPLE IV

| | Amounts | Percent Relationships |
|---|---|---|
| Phosphor | 3 grams | 0.27 g./cc. vehicle. |
| Methyl cellulose (4,000 cps.) | 5 cc.—1% solution. | 1.7% of phosphor. |
| Ammonium hydroxide (28% solution). | 1 cc | 9% of vehicle. |
| Isopropyl alcohol | 4 cc | 36% of vehicle. |
| Triethylene glycol (or equivalent plasticizer). | 1 cc | 9% of vehicle. |

EXAMPLE V

| | Amounts | Percent Relationships |
|---|---|---|
| Phosphor | 3 grams | 0.27 g./cc. vehicle. |
| Methyl cellulose (4,000 cps.) | 3 cc.—2% solution. | 2% of phosphor. |
| Butylamine | 1 cc | 9% of vehicle. |
| Isopropyl alcohol | 7 cc | 64% of vehicle. |

In preparing the coating composition, I first admix by ball-milling for about one hour, the luminescent material and aqueous solution of methyl cellulose in amounts within the ranges as hereinbefore specified. The flow agent, alkalizer-dispersing agent and plasticizer, if desired, are then added in the heretofore-noted ranges. A desirable viscosity has been found to be about 150 cps. As heretofore noted, the viscosity of the paint may be governed by controlling the amount of flow agent and water which is included in the paint. Knowing the limitations in amounts of components of the paint, other than the flow agent, the required amount of flow agent and water to result in the desired viscosity may be readily empirically determined by any man skilled in the art. The resulting mixture of phosphor, binder, water, flow agent, and alkalizing-dispersing agent is then ball-milled for 8 hours to form a suspension of luminescent material in the liquid vehicle, which vehicle as heretofore noted, consists of water, a flow agent, binder and alkalizing-dispersing agent. If desired, the plasticizer may be added at the same time as the flow agent, in amounts as heretofore noted.

As an alternative method of preparing the coating composition, the preliminary ball-milling of phosphor and aqueous solution of methyl cellulose may be omitted and all components of the final coating composition may be milled together for about eight hours to form the paint.

In applying my paint to the inside of the fluorescent lamp envelope, any conventional means of application may be used, such as flowing or flushing. The coating is then dried and the methyl cellulose subsequently removed by baking in the presence of oxygen.

In drying the coating, it is preferable in order to eliminate streaks and poor coating textures, to carefully control the conditions of air velocity, temperature and humidity while drying the coating prior to burning out the methyl cellulose binder. Air velocities of 300 to 350' per minute have been found satisfactory, and the conditions of air flow, temperature and humidity should be so controlled that the envelopes dry in less than one hour.

After the paint is dried, the methyl cellulose is baked out of the remaining coating by heating to a temperature between approximately 950° F. to 1250° F., until the methyl cellulose is completely baked out. The fluorescent lamp is then completed by sealing the mounts into the ends of the phosphor-coated tube, exhausting, and filling with the proper gas, such as argon and mercury vapor, as is common in the art.

It will be recognized that the objects of the invention have been achieved by providing a coating composition and method of preparation which is economical to use and which produces an excellent coating for use in applying a luminescent coating to a vitreous surface.

While in accordance with the Patent Statutes one best known embodiment of the invention has been illustrated and described, it is to be particularly understood that the invention is not limited thereto or thereby.

I claim:

1. A coating composition for applying luminescent materials to vitreous surfaces comprising a phosphor suspended in a liquid vehicle, said liquid vehicle comprising methyl cellulose, water, a completely water soluble mono-hydroxy alcohol having a boiling point below that of water and an alkalizing-dispersing agent selected from the group consisting of ammonium hydroxide and a water soluble amine whose boiling point is below that of water, the pH of said composition not exceeding 12, the percentage by weight of said methyl cellulose to said phosphor being from 1 to 3, said phosphor being suspended in said liquid vehicle in the proportions of from 0.25 to 0.5 gram per cubic centimeter, the percentage by volume of said alkalizing-dispersing agent to said vehicle being from 3 to 10, the percentage by volume of said flow agent to said vehicle being not less than 30, and the proportions of said flow agent and water in said composition being such that the viscosity of said composition at 20° C. falls within the range of 100 to 200 cps.

2. A coating composition for applying luminescent materials to vitreous surfaces comprising a phosphor suspended in a liquid vehicle, said liquid vehicle comprising methyl cellulose, water, a completely water soluble mono-hydroxy alcohol having a boiling point below that of water, an alkalizing-dispersing agent selected from the group consisting of ammonium hydroxide and a water soluble amine whose boiling point is below that of water and a plasticizer, the pH of said composition not exceeding 12, the percentage by weight of said methyl cellulose to said phosphor being from 1 to 3, said phosphor being suspended in said liquid vehicle in the proportions of from 0.25 to 0.5 gram per cubic centimeter, the percentage by volume of said alkalizing-dispersing agent to said vehicle being from 3 to 10, the percentage by volume of said flow agent to said vehicle being not less than 30, the percentage by volume of said plasticizer to said liquid vehicle being from 0 to 25, and the proportions of said flow agent and water in said composition being such that the viscosity of said composition at 20° C. falls within the range of 100 to 200 cps.

3. A coating composition for applying luminescent materials to vitreous surfaces comprising a phosphor suspended in a liquid vehicle, said liquid vehicle comprising methyl cellulose, water, isopropyl alcohol and 28% ammonium hydroxide, the percentage by weight of said methyl cellulose to said phosphor being about 2, said phosphor being suspended in said liquid vehicle in the proportions of about 0.29 gram per cubic centimeter, the percentage by volume of said ammonium hydroxide to said vehicle being about 4.8, and the percentage by volume of said isopropyl alcohol to said vehicle being about 67.

4. A coating composition for applying luminescent materials to vitreous surfaces comprising a phosphor suspended in a liquid vehicle, said liquid vehicle comprising methyl cellulose, water, isopropyl alcohol and 28% ammonium hydroxide, the percentage by weight of said methyl cellulose to said phosphor being about 2, said phosphor being suspended in said liquid vehicle in the proportions of about 0.27 gram per cubic centimeter, the percentage by volume of said ammonium hydroxide to said vehicle being about 9, and the percentage by volume of said isopropyl alcohol to said vehicle being about 64.

5. A coating composition for applying luminescent materials to vitreous surfaces comprising a phosphor suspended in a liquid vehicle, said liquid vehicle comprising methyl cellulose, water, methyl alcohol and 28% ammonium hydroxide, the percentage by weight of said methyl cellulose to said phosphor being about 1.3, said phosphor being suspended in said liquid vehicle in the proportions of about 0.42 gram per cubic centimeter, the percentage by volume of said ammonium hydroxide to said vehicle being about 9, and the percentage by volume of said methyl alcohol to said vehicle being about 64.

6. A coating composition for applying luminescent materials to vitreous surfaces comprising a phosphor suspended in a liquid vehicle, said liquid vehicle comprising methyl cellulose, water, isopropyl alcohol, triethylene glycol and 28% ammonium hydroxide, the percentage by weight of said methyl cellulose to said phosphor being about 1.7, said phosphor being suspended in said liquid vehicle in the proportions of about 0.27 gram per cubic centimeter, the percentage by volume of said ammonium hydroxide to said vehicle being about 9, the percentage by volume of said isopropyl alcohol to said vehicle being about 36, and the percentage by volume of said triethylene glycol to said liquid vehicle being about 9.

References Cited in the file of this patent

UNITED STATES PATENTS

| 2,362,761 | Medl | Nov. 14, 1944 |
| 2,429,404 | Dixon | Oct. 21, 1947 |
| 2,514,131 | Kaszuba | July 4, 1950 |

OTHER REFERENCES

Methocel-Dow Chem. Co., Publication, 60 page pamphlet—1949, pp. 4, 13–18. (Copy in Scientific Library.)